United States Patent
Han et al.

(10) Patent No.: US 12,276,594 B2
(45) Date of Patent: Apr. 15, 2025

(54) SHAFT WALL PRESSURE CORROSION TEST SYSTEM

(71) Applicant: CHINA UNIVERSITY OF MINING AND TECHNOLOGY, Xuzhou (CN)

(72) Inventors: Tao Han, Xuzhou (CN); Yong Xue, Xuzhou (CN); Tingting Luo, Xuzhou (CN); Yu Zhang, Xuzhou (CN); Weihao Yang, Xuzhou (CN); Yansen Wang, Xuzhou (CN); Zhijiang Yang, Xuzhou (CN); Chi Zhang, Xuzhou (CN); Tao Zhang, Xuzhou (CN); Jiahui Huang, Xuzhou (CN); Haipeng Li, Xuzhou (CN)

(73) Assignee: CHINA UNIVERSITY OF MINING AND TECHNOLOGY, Xuzhou (CN)

( * ) Notice: Subject to any disclaimer, the term of this patent is extended or adjusted under 35 U.S.C. 154(b) by 0 days.

(21) Appl. No.: 18/693,538

(22) PCT Filed: Dec. 19, 2022

(86) PCT No.: PCT/CN2022/139893
§ 371 (c)(1),
(2) Date: Mar. 20, 2024

(87) PCT Pub. No.: WO2023/116598
PCT Pub. Date: Jun. 29, 2023

(65) Prior Publication Data
US 2024/0264069 A1    Aug. 8, 2024

(30) Foreign Application Priority Data
Dec. 20, 2021   (CN) .......................... 202111562346.7

(51) Int. Cl.
*G01N 17/00*    (2006.01)

(52) U.S. Cl.
CPC .................................. *G01N 17/002* (2013.01)

(58) Field of Classification Search
CPC ........ G01N 17/02; G01N 17/00; G01N 17/04; G01N 17/002
(Continued)

(56) References Cited

FOREIGN PATENT DOCUMENTS

| CN | 103091173 A | 5/2013 |
|---|---|---|
| CN | 203534910 U | 4/2014 |

(Continued)

*Primary Examiner* — Daniel S Larkin
*Assistant Examiner* — Nashmiya S Fayyaz
(74) *Attorney, Agent, or Firm* — Bayramoglu Law Offices LLC

(57) ABSTRACT

A shaft wall pressure corrosion test system includes a pressure bearing device, a confining pressure application device, and a seepage pressure application device. The confining pressure application device and the seepage pressure application device provide confining pressure and seepage pressure for the pressure bearing device, respectively, and keep the confining pressure and the seepage pressure constant on the pressure bearing device. In the system, axial pressure is applied to a piston by means of a hydraulic jack and is then transferred to a sample to complete axial pressure application. The confining pressure is applied to hydraulic oil by a manual pump in combination with an energy accumulator and then transferred to the sample to complete confining pressure application. The seepage pressure is applied to a corrosion solution by a water pump group in combination with an energy accumulator and then transferred to the sample to complete seepage pressure application.

3 Claims, 1 Drawing Sheet

(58) Field of Classification Search
 USPC .................................................. 422/53; 73/86
 See application file for complete search history.

(56) References Cited

FOREIGN PATENT DOCUMENTS

| | | | | |
|---|---|---|---|---|
| CN | 102565307 B | * | 12/2014 | |
| CN | 104535470 A | | 4/2015 | |
| CN | 104819926 A | | 8/2015 | |
| CN | 105181469 A | | 12/2015 | |
| CN | 108801799 A | * | 11/2018 | ............... G01N 3/12 |
| CN | 208224038 U | | 12/2018 | |
| CN | 112284923 A | | 1/2021 | |
| CN | 112432881 A | | 3/2021 | |
| CN | 214173964 U | * | 9/2021 | ............. G01N 11/00 |
| CN | 113790973 A | | 12/2021 | |
| CN | 114252389 A | | 3/2022 | |
| JP | 2005291862 A | | 10/2005 | |

\* cited by examiner

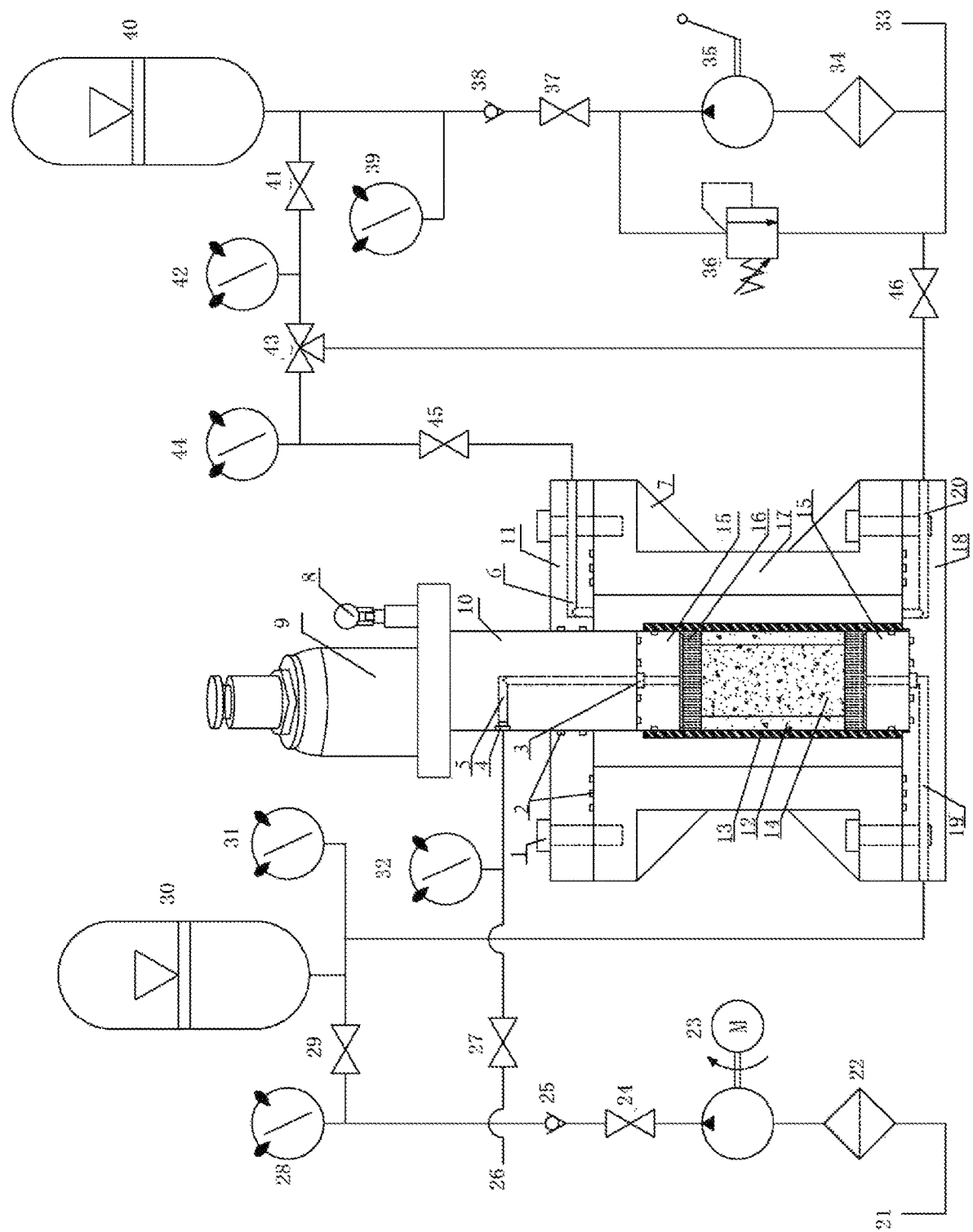

SHAFT WALL PRESSURE CORROSION TEST SYSTEM

CROSS REFERENCE TO THE RELATED APPLICATIONS

This application is the national phase entry of International Application No. PCT/CN2022/139893, filed on Dec. 19, 2022, which is based upon and claims priority to Chinese Patent Application No. 202111562346.7, filed on Dec. 20, 2021, the entire contents of which are incorporated herein by reference.

TECHNICAL FIELD

The present invention relates to the technical field of rock and soil mechanics testing equipment, and in particular, to a shaft wall pressure corrosion test system.

BACKGROUND

In recent years, with the increasing demand for deep underground resources in China, a buried depth of underground structures increases. As the depth increases, an environment where a concrete structure is located is increasingly harsh, and the damage caused by groundwater corrosion is increasingly serious. Particularly, the corrosion of an outer edge of a concrete shaft wall belongs to multi-field coupling corrosion of physical, chemical and stress in a high-pressure environment. This damage is increasingly serious with the increase of the buried depth of the concrete structure of the shaft wall, therefore, sufficient attention and deep research are required.

At present, concrete is one of the most important civil engineering and building materials, and is widely used in overground and underground building engineering. However, due to the influence of many factors, a large number of reinforced concrete structures cannot reach a scheduled service life and fail in advance. The failure is caused by insufficient resistance of a structural design or by adverse change of the load in use. A building mostly fails before a designed service life due to the reduction of the durability and stability of the building caused by the corrosion of a corrosion solution. This type of engineering is common. For example, a vertical shaft of the Laiwu Mine in Shandong Province was built and put into use less than five years ago. At the seepage point in the shaft, the corrosion of the salt-containing interlayer is the most serious, and the sand and stone are separated. The interlayer can be dug into 5-10 cm with fingers. The auxiliary shaft of Shunhe Coal Mine in Henan Province has been in service for less than 5 years. Corrosion phenomena caused by the corrosion solution appear on an inner edge of the shaft wall, such as large-area bulging, pulverization and shedding, and the maximum corrosion depth can reach 150 mm, accounting for almost ¼ of a thickness of a shaft wall. During the routine inspection in September 2015, it was found that cracks and damage occurred in the auxiliary shaft of Luohe Iron Mine in Anhui Province, the concrete corrosion phenomena such as concrete argillization, stripping, seepage water and water spraying on a shaft wall exist on a surface of the shaft wall, and two serious shaft wall pitted surfaces and concrete block falling phenomena exist near an elevation of −420 m. It is found that the high concentration of $SO_4^{2-}$ in the seepage water is the main cause of shaft wall damage. The phenomena of inner surface peeling, pulverization and shedding appear on the shaft wall in a short time after the auxiliary shaft of Mataihao Coal Mine in Inner Mongolia is built, and the depth of inner surface penetrating into the shaft wall is about 80-150 mm. The $SO_4^{2-}$ content in the groundwater in this area exceeds 1500 mg/L, which belongs to typical $SO_4^{2-}$ erosion damage. It can be seen that the corrosion damage of a concrete corrosion solution is still the most harmful and common damage. Particularly, deeply buried underground projects are subject to the dual effects of high seepage pressure and high geo-stress, and therefore it is desirable to effectively solve the problem of corrosion of concrete shaft walls.

At present, there are few researches on corrosion of a corrosion solution of shaft wall concrete under multi-pressure coupling, especially the transmission rule of acid radical ions under the coupling of axial pressure-seepage pressure-confining pressure has not been studied. The present invention aims to design a test device system in which a sample is corroded by a corrosion solution for a long time under the triaxial stress condition of axial pressure-seepage pressure-confining pressure, and provides a device basis for performing test research, safety assessment, and durability protection of deeply buried concrete structures.

SUMMARY

To resolve the foregoing problems, the present invention provides a shaft wall pressure corrosion test system, and specifically a device system for a sample subjected to long-term pressure-applied corrosion by a corrosion solution under the triaxial stress condition of axial pressure-seepage pressure-confining pressure. The shaft wall pressure corrosion test system has the advantages of a good pressure application effect and good integral sealing performance, and corrosion test research is performed on a sample under the triaxial pressure application condition, the dilemma that the sample corrosion test research is performed only under the uniaxial pressure or single-seepage pressure condition in the past is alleviated, and this device system is simple in structural design, small in size, light in weight, convenient to operate, and easy to operate.

To achieve the foregoing objective, the present invention provides the following technical solutions.

The present invention provides a shaft wall pressure corrosion test system, including: a pressure bearing device, a confining pressure application device, and a seepage pressure application device, the pressure bearing device includes a piston, an upper flange, a pressure head, a porous water-permeable steel plate, a pressure bearing cylinder and a base, a top and a bottom of the pressure bearing cylinder are fixedly connected to the upper flange and the base, respectively, a sample is placed in an inner cavity of the pressure bearing cylinder, the porous water-permeable steel plate and the pressure head are arranged on a top and a bottom of the sample, respectively, the pressure head connected to a bottom of a piston is configured to apply pressure to the porous water-permeable steel plate, and a hydraulic jack is arranged on a top of the piston;

the confining pressure application device includes a manual pump, a first energy accumulator, a three-way valve, and two pressure gauges, hydraulic oil in an oil tank is pressure-applied sequentially through the manual pump and the first energy accumulator via a pipeline, the pressure-applied hydraulic oil is connected to a hydraulic oil inlet channel on the base through an oil outlet end of the first energy accumulator, one of the pressure gauges and the three-way valve, a hydraulic oil outlet channel is formed on the upper flange, a valve is installed at the hydraulic oil outlet channel, and the hydraulic oil flowing out from the upper flange flows through the hydraulic oil outlet channel, the other pressure gauge and the three-way valve and then flows back again to participate in pressure application and circulation of the hydraulic oil in the confining pressure application;

the seepage pressure application device includes a water pump group and a second energy accumulator, wherein a corrosion solution in a corrosion-resistant water tank flows through a filter element, then the corrosion solution is pressure-applied and pumped by the water pump group and sequentially flows through a valve, a one-way valve, a pressure gauge and a valve to enter the second energy accumulator, and the corrosion solution pressure-applied and stabilized by the second energy accumulator flows through a pressure gauge, then flows in from a corrosion solution inlet channel on the base and finally flows out from a corrosion solution outlet channel on the piston.

Preferably, a water-permeable stone cylinder is arranged in an inner cavity of the pressure bearing cylinder, the sample is placed in the water-permeable stone cylinder, and the water-permeable stone cylinder is isolated from hydraulic oil through an isolation film.

Preferably, a load sensor is arranged on an upper part of the piston.

Preferably, a pressure-applying handle configured to control the pressure applied by the hydraulic jack is arranged on one side of the hydraulic jack.

Preferably, the seepage pressure application device further includes a vacuum device, the vacuum device is provided at a corrosion solution flow outlet, the vacuum device is used to extract the corrosion solution when the corrosion solution is difficult to flow out, and an empty corrosion-resistant water tank is adopted to collect waste liquid after corrosion.

Compared with the prior art, the present invention achieves the following beneficial technical effects.

According to the shaft wall pressure corrosion test system provided by the present invention, the axial pressure is applied to the piston through a lever and then transferred to a sample to complete axial pressure application. The confining pressure is applied to hydraulic oil by a manual pump in combination with an energy accumulator and then transferred to the sample to complete confining pressure application. The seepage pressure is applied to a corrosion solution by a water pump group in combination with an energy accumulator and then transferred to the sample to complete seepage pressure application. Therefore, the dilemma of a device for research on sample corrosion by a corrosion solution lacking multi-factor coupling in the past is alleviated, and the design of a device system for research on sample corrosion by a corrosion solution with multi-factor coupling is provided.

BRIEF DESCRIPTION OF THE DRAWINGS

In order to more clearly illustrate the technical solutions in the embodiments of the present invention or in the prior art, the drawings required to be used in the description of the embodiments are briefly introduced below. It is obvious that the drawings in the description below are some embodiments of the present invention, and those of ordinary skill in the art can obtain other drawings according to the drawings provided herein without creative efforts.

FIGURE is a composition diagram of an overall structure of a shaft wall pressure corrosion test system.

In the drawings, 1: hexagon socket screw; 2: sealing ring; 3: reaming groove; 4: one-way valve; 5: corrosion solution outlet channel; 6: hydraulic oil outlet channel; 7: steel plate stiffening rib; 8: pressure-applying handle; 9: hydraulic jack; 10: piston; 11: upper flange; 12: water-permeable stone cylinder; 13: isolation film; 14: sample; 15: pressure head; 16: porous water-permeable steel plate; 17: pressure bearing cylinder; 18: base; 19: corrosion solution inlet channel; 20: hydraulic oil inlet channel; 21: corrosion-resistant water tank; 22: filter element; 23: water pump group; 24: valve; 25: one-way valve; 26: vacuum; 27: valve; 28: pressure gauge; 29: valve; 30: second energy accumulator; 31: pressure gauge; 32: pressure gauge; 33: oil tank; 34: filter element; 35: manual pump; 36: overflow valve; 37: valve; 38: one-way valve; 39: pressure gauge; 40: first energy accumulator; 41: valve; 42: pressure gauge; 43: three-way valve; 44: pressure gauge; 45: valve; and 46: valve.

DETAILED DESCRIPTION OF THE EMBODIMENTS

The following clearly and completely describes the technical solutions in embodiments of the present invention with reference to the accompanying drawings in embodiments of the present invention. It is clear that the described embodiments are merely a part rather than all of embodiments of the present invention. Based on the embodiments of the present invention, all other embodiments obtained by those of ordinary skill in the art without creative effort fall within the protection scope of the present invention.

To make the objectives, features, and advantages of the present invention more apparent and understandable, the following describes the present invention in detail with reference to the accompanying drawings and specific implementations.

As shown in FIGURE, this embodiment provides a shaft wall pressure corrosion test system, including: a pressure bearing device, a confining pressure application device, and a seepage pressure application device.

Specifically, the pressure bearing device includes a piston 10, an upper flange 11, a pressure head 15, a porous water-permeable steel plate 16, a pressure bearing cylinder 17, and a base 18.

1) The axial pressure is applied to a sample 14 by controlling a pressure-applying handle 8 on a right side of a hydraulic jack 9. The pressure is transmitted through the piston 10, the pressure head 15 at an upper part and the upper porous water-permeable steel plate 16 at an upper part, and is then applied to the sample 14. During pressure application, the pressure bearing device is placed at a proper position and a proper height below the hydraulic jack 9, and then a load sensor is placed on an upper part of the piston 10 and configured to measure whether a value of the applied axial pressure meets a requirement. Finally, the pressure-applying handle 8 on a right side on the hydraulic jack 9 is controlled to be aligned and fixed and to apply pressure. (Vertical Loading)

In this embodiment, the water-permeable stone cylinder 12 is isolated from the hydraulic oil by the isolation film 13, and the isolation film 13 is used to isolate the hydraulic oil flowing in a cavity of the pressure bearing cylinder 17 from a corrosion solution flowing in the water-permeable stone cylinder 12, so as to avoid the mixing of the hydraulic oil and the corrosion solution, which will affect the test results of the sample corrosion by the corrosion solution.

2) The confining pressure application is to apply confining pressure to the hydraulic oil in the device until a pressure value reaches a target value based on the combination between a manual pump 35 and a first energy accumulator 40. The hydraulic oil is pressure-applied at a low precision by the manual pump 35 to reach a value close to the target pressure value, and then is pressure-applied at a high precision by the first energy accumulator 40 (the first energy accumulator 40 can also stabilize the water pressure), and then the pressure-applied hydraulic oil is continuously injected into the cavity of the pressure bearing device through a hydraulic oil inlet channel 20 on a base 18. Then, it is determined whether the cavity of the pressure bearing cylinder 17 is filled with the hydraulic oil by observing whether the hydraulic oil flows out from the valve 45 installed at the hydraulic oil outlet channel 6 of the upper flange 11. After the cavity is filled with the hydraulic oil, the valve on a side where the three-way valve 43 is connected to the pressure gauge 44 is closed, the pressure of the outflowing hydraulic oil is tested through the pressure gauge 44, whether the reading of the pressure gauge is consistent with that of the pressure gauge 42 is observed, then the pressure stabilizing effect of the first energy accumulator 40 is further determined, whether the applied pressure meets a requirement is observed, and if the applied pressure does not meet the requirement, the first energy accumulator 40 is controlled to continuously apply pressure until the design requirement is met. When the pressure of the hydraulic oil is stable, the three-way valve 43 is completely opened, so that the hydraulic oil flowing out from the hydraulic oil outlet channel 6 on the upper flange 11 participates in the whole oil circulation and pressure application, the use times of the hydraulic oil are increased, and the stability of the confining pressure can be ensured. (Confining pressure application)

3) The seepage pressure application is to make a pressure value of the corrosion solution flowing in the pressure bearing device reach a target value and corrode a sample through the water pump group 23 in combination with the second energy accumulator 30. The corrosion solution is pumped into the second energy accumulator 30 after the pressure value of the corrosion solution is close to the target pressure value through low-precision pressure application by the water pump group 23 formed by combining a plurality of submersible pumps, and is injected into a corrosion solution flow channel in the pressure bearing device after high-precision pressure application and pressure stabilization are performed on the water pressure through the second energy accumulator 30 until the pressure bearing device is filled with the corrosion solution. Then, whether the applied pressure meets the requirement is detected by observing the reading of a pressure gauge 32 mounted at the corrosion solution outlet channel 5 on the upper flange 11, and whether the pressure stabilization of the second energy accumulator 30 on the water pressure can achieve the effect is checked. When the pressure is insufficient, the second energy accumulator 30 is controlled to continue to apply pressure until the design requirement is met. (Seepage pressure application)

The present invention mainly applies pressure vertically on a sample 14 through a hydraulic jack 9, and applies seepage pressure and confining pressure on the sample 14 through a hydraulic pump in combination with an energy accumulator, so that the sample 14 is in a triaxial stress condition and keeps a pressure stabilizing state, and the inflowing corrosion solution corrodes the sample for a long time to simulate the actual stress stratum environment condition in which a mine shaft is corroded by underground water.

The specific pressure application and flow paths are as follows.

1) The flow path of the corrosion solution: the corrosion solution in the corrosion-resistant water tank 21 flows through the filter element 22, is pressure-applied and pumped by the water pump group 23 formed by combining a plurality of submersible pumps, flows through the valve 24, the one-way valve 25, the pressure gauge 28 and the valve 29, and flows into the second energy accumulator 30. The second energy accumulator 30 precisely applies pressure to the corrosion solution with a certain pressure and stabilizes the pressure, so that the corrosion solution with a certain pressure flows from the corrosion solution inlet channel 19 on the base 18 of the pressure bearing device after flowing through the pressure gauge 31, flows through the pressure head 15 at a lower part and the solution flow channel inside the porous water-permeable steel plate 16, and flows in the water-permeable stone cylinder 12 to be continuously accumulated. Meanwhile, the corrosion solution corrodes a side surface of the sample 14 until the corrosion solution is fully accumulated, and finally flows out from the corrosion solution outlet channel 5 on the piston 10 through the porous water-permeable steel plate 16 at the upper part of the pressure bearing device, the pressure head 15 at the upper part, and the piston 10. Whether the pressure stabilizing effect of the second energy accumulator 30 on the water pressure meets the requirement can be determined by observing the readings of the pressure gauge 31 and the pressure gauge 32. Meanwhile, the vacuum device 26 is provided at a corrosion solution flow outlet, when the corrosion solution flows slowly or is difficult to flow out due to other reasons, the vacuum device 26 is used to extract the corrosion solution, and an empty corrosion-resistant water tank is adopted to collect waste liquid after corrosion. (Seepage pressure application)

2) the flow path of the hydraulic oil: the hydraulic oil stored in the oil tank 33 passes through the filter element 34 and enters the manual pump 35, the manual pump 35 applies pressure to the hydraulic oil, and the pressure-applied hydraulic oil flows through the valve 37, the one-way valve 38 and the pressure gauge 39, and enters the first energy accumulator 40. The first energy accumulator 40 precisely applies pressure to the hydraulic oil with certain pressure and stabilizes the pressure, so that the hydraulic oil with certain pressure flows through the valve 41 and the pressure gauge 42, flows in from the hydraulic oil inlet channel 20 on the base 18 of the pressure bearing device after flowing out from valves at a right side and a lower side of the three-way valve 43, continuously accumulates in the cavity of the pressure bearing cylinder 17 until the cavity is full, flows out from the hydraulic oil outlet channel 6 on the upper flange 11, then flows through the valve 45 and the pressure gauge 44, and is connected to the confining pressure application device to form oil circulation and pressure application. (Confining pressure application)

In view of the technical defect that the existing test device can only perform test research on the concrete sample corrosion by the corrosion solution under the condition of a single pressure factor, the present invention provides a test device that can simulate the actual stressed stratum environment condition in which a mine shaft is corroded by the corrosion solution, namely, the test device that keeps the sample in a steady state under the triaxial stress condition of axial pressure-seepage pressure-confining pressure and corroded by corrosion solution for a long time. Compared with the previous existing test device, the present invention has the following innovation points.

1. The pressure application and pressure stabilization of the confining pressure and the seepage pressure are implemented through the combination of the energy accumulator, the water pump group 23 and the manual pump 35, where the water pump group 23 and the manual pump 35 provide wide-range pressure, and the energy accumulator is used to precisely apply pressure and stabilize the liquid pressure. The principle of the energy accumulator is that the internal structure of the device is divided into two parts, one part is used to place an air bag, and the other part is used to store hydraulic oil. When the energy accumulator works, the liquid pressure is changed by controlling the air pressure in the air bag. The energy accumulator device has a small volume and does not occupy too much field area, so that the problems that a large-sized servo pressure applying and pressure stabilizing device occupies too much field, the processing cost of the device is too high, the power consumption is too high and the like in the previous corrosion test are solved.
2. When the water pump group 23 and the manual pump 35 pump liquid into the pressure bearing device, a combination device of a set of valves and one-way valves (such as the valve 24+the one-way valve 25; the valve 37+the one-way valve 38) is installed at the position of the pipeline for outputting liquid by the water pump group 23 and the manual pump 35, so as to prevent the liquid from flowing back and reduce the loss of the water pump group 23 and the manual pump 35.
3. When the confining pressure application is performed, an overflow valve 36 is added, and the overflow valve 36 plays a safety protection role in the system and is used to ensure the safe use of a pressure pipeline and a pressure container. When the system pressure value exceeds a specified value, the safety valve is opened, and a part of gas in the system is discharged into the atmosphere, so that the system pressure value does not exceed the allowable value, and the system is ensured not to cause accidents due to overhigh pressure.
4. When confining pressure application is performed, a three-way valve 43 is added between a pressure gauge 42 and a pressure gauge 44, the purpose of separately testing the pressure value of hydraulic oil flowing into a pressure bearing device and the pressure value of hydraulic oil flowing out of the pressure bearing device is achieved by controlling the three-way valve 43, and then whether the pressure stabilizing effect of the first energy accumulator 40 meets the requirement is determined by observing the readings of the pressure gauge 42 and the pressure gauge 44. Meanwhile, the hydraulic oil flowing out of the hydraulic oil outlet channel 6 on the upper flange 11 can flow into a pressure application pipeline of the hydraulic oil by controlling the three-way valve 43, so that oil circulation and pressure application is formed, the use times of the hydraulic oil are increased, and the pressure applying and pressure stabilizing effect of the confining pressure is enhanced.

It should be noted that, for those skilled in the art, it is clear that the present invention is not limited to details of the foregoing example embodiments, and the present invention can be implemented in another specific form without departing from the spirit or basic features of the present invention. Therefore, the embodiments should be considered in all respects as exemplary and non-restrictive. The scope of the present invention is defined by the appended claims rather than the above description, and therefore all changes that come within the meaning and range of equivalents to the claims are intended to be embraced in the present invention. Any reference numeral in the claim should not be construed as limiting the claim concerned.

The principle and implementation of the present invention are described herein by using specific examples. The descriptions about embodiments of the present invention are merely provided, to help understand the method and core ideas of the present invention. In addition, those of ordinary skill in the art can make variations to the present invention in terms of the specific implementations and application scopes according to the ideas of the present invention. Therefore, the content of specification shall not be construed as a limit to the present invention.

What is claimed is:

1. A shaft wall pressure corrosion test system, comprising: a pressure bearing device, a confining pressure application device, and a seepage pressure application device,
    wherein the pressure bearing device comprises a piston, an upper flange, first and second pressure heads, first and second porous water-permeable steel plates, a pressure bearing cylinder, and a base, a top and a bottom of the pressure bearing cylinder are fixedly connected to the upper flange and the base, respectively, a water-permeable stone cylinder is arranged in an inner cavity of the pressure bearing cylinder, a sample is placed in the inner cavity of the pressure bearing cylinder, the sample is placed in the water-permeable stone cylinder, the first and second porous water-permeable steel plates and the first and second pressure heads are arranged on a top and a bottom of the sample, respectively, the first pressure head is connected to a bottom of the piston and is configured to apply pressure to the first porous water-permeable steel plate, the water-permeable stone cylinder is isolated from hydraulic oil through an isolation film, and a hydraulic jack is arranged on a top of the piston;
    the confining pressure application device comprises a manual pump, a first energy accumulator, a three-way valve, and two pressure gauges, the two pressure gauges are a first pressure gauge and a second pressure gauge respectively, hydraulic oil in an oil tank is pressure-applied sequentially through the manual pump and the first energy accumulator via a pipeline, a first valve and a first one-way valve are sequentially connected in series between the manual pump and the first energy accumulator, the pressure-applied hydraulic oil is connected to a hydraulic oil inlet channel on the base through an oil outlet end of the first energy accumulator, a second valve, the first pressure gauge, a right-port- and a lower-port of the three-way valve, a hydraulic oil outlet channel is formed on the upper flange, a third valve is mounted at the hydraulic oil outlet channel, and the hydraulic oil flowing out from the upper flange flows through the hydraulic oil outlet channel, the third valve, the second pressure gauge and the three-way valve and then flows back again to participate in pressure application and circulation of the hydraulic oil in the confining pressure application;

the seepage pressure application device comprises a water pump group and a second energy accumulator, a corrosion solution in a corrosion-resistant water tank flows through a filter element, then the corrosion solution is pressure-applied and pumped by the water pump group and sequentially flows through a fourth valve, a second one-way valve, a third pressure gauge and a fifth valve to enter the second energy accumulator, the corrosion solution pressure-applied and stabilized by the second energy accumulator flows through a fourth pressure gauge, then flows in from a corrosion solution inlet channel on the base, flows through the second pressure head at a lower part and the solution flow channel inside the second porous water-permeable steel plate, and flows in the water-permeable stone cylinder to be continuously accumulated; meanwhile, the corrosion solution corrodes a side surface of the sample until the corrosion solution is fully accumulated, and finally flows out from a corrosion solution outlet channel on the piston through the first porous water-permeable steel plate at the upper part of the pressure bearing device, the first pressure head at the upper part, and the piston, and the corrosion solution outlet channel is connected to a fifth pressure gauge;

the seepage pressure application device further comprises a vacuum device, the vacuum device is provided at a corrosion solution flow outlet, the vacuum device is used to extract the corrosion solution when the corrosion solution is difficult to flow out, and an empty corrosion-resistant water tank is adopted to collect waste liquid after corrosion.

2. The shaft wall pressure corrosion test system according to claim 1, wherein a load sensor is arranged on an upper part of the piston.

3. The shaft wall pressure corrosion test system according to claim 2, wherein a pressure-applying handle configured to control a pressure applied by the hydraulic jack is arranged on one side of the hydraulic jack.

* * * * *